J. A. ANSLEY.
CONVERTIBLE BOX CAR.
APPLICATION FILED JULY 22, 1909.
958,575.
Patented May 17, 1910.
2 SHEETS—SHEET 1.
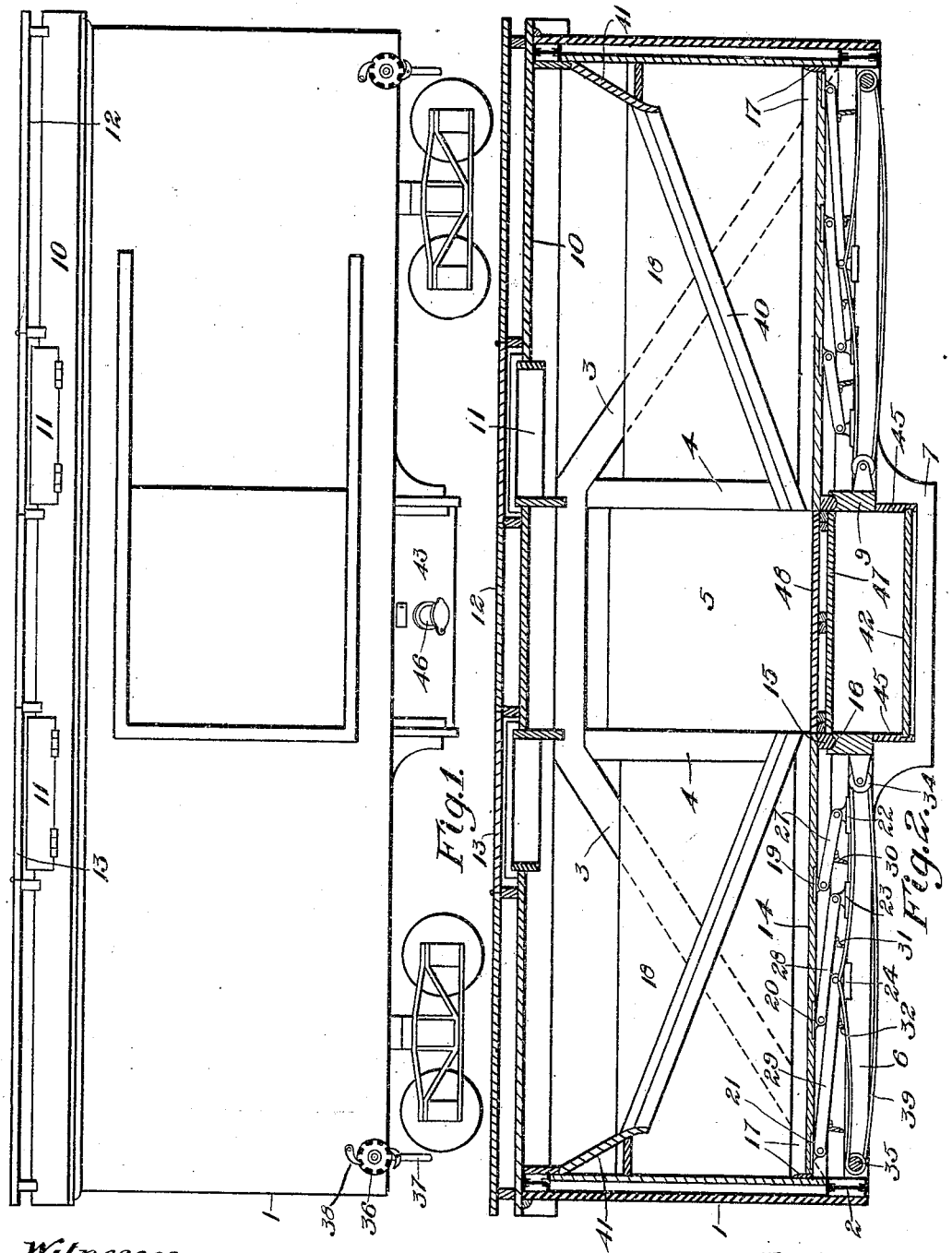
Witnesses
Inventor

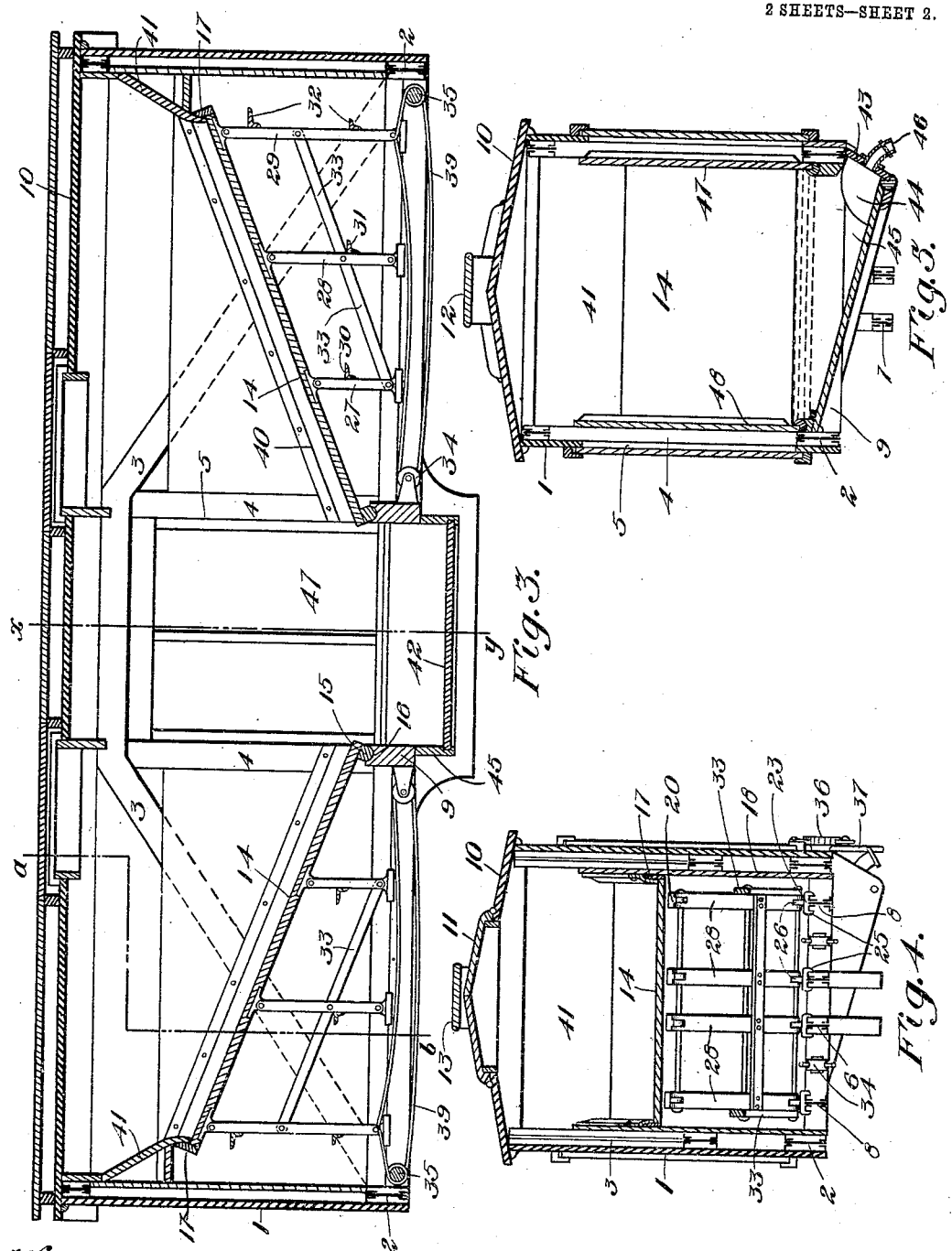

UNITED STATES PATENT OFFICE.

JOHN ALBERT ANSLEY, OF THESSALON, ONTARIO, CANADA.

CONVERTIBLE BOX-CAR.

958,575.  Specification of Letters Patent.  Patented May 17, 1910.

Application filed July 22, 1909. Serial No. 508,963.

*To all whom it may concern:*

Be it known that I, JOHN ALBERT ANSLEY, a subject of the King of Great Britain, and resident of Thessalon, in the district of Algoma, in the Province of Ontario, in the Dominion of Canada, have invented certain new and useful Improvements in Convertible Box-Cars, of which the following is a specification.

The invention relates to improvements in convertible box cars, as described in the following specification and illustrated in the accompanying drawings that form part of the same.

The invention consists essentially in the novel construction and arrangement of parts, whereby the floor of a car may be raised to form a hopper shaped interior, and whereby the car is braced from end to end by an overhead truss structure.

The objects of the invention are, to facilitate the unloading of grain from cars, and to provide a freight car which may be used for ordinary purposes and easily converted into a car specially adapted for the handling of grain, thus effecting a considerable saving in the transportation of grain, also a saving in the expense of maintenance of the rolling stock of railways handling grain through the adaptation of the car for general use.

In the drawings, Figure 1 is a side elevational view of my improved car. Fig. 2 is a central longitudinal vertical section through the car as used for ordinary freight purposes. Fig. 3 is a central longitudinal vertical section showing the car converted into a special grain car with the movable floors forming a hopper. Fig. 4 is a vertical cross section through the line *a—b* Fig. 3. Fig. 5 is a vertical cross section through the line *x—y* Fig. 3.

Like numerals of reference indicate corresponding parts in each figure.

Referring to the drawings, 1 is the car body having a sill 2 extending around the bottom thereof preferably formed of a steel structure of any suitable cross section, a girder section being shown formed of a plate with angle irons at the top and bottom.

3 are trusses extending upwardly from the ends of the side sills 2 over the posts 4 arranged at each side of the central door openings 5.

6 are girders extending between the end sills of the car and rigidly secured thereto and having the downward depressed central portion 7.

8 are intermediate girders arranged between the side sills and the girders 6 and extending between the end sills and the cross sills 9 arranged to each side of the door openings 5.

10 is the top of the car having the trap doors 11 arranged therein opening upwardly at each side of the center, said trap doors being preferably arranged at each side of the side door openings.

12 is the runner board extending along the top of the car having hinged sections 13 over the trap doors 11.

14 are the main floors of the car extending from the cross sills 9 to each end of the car, each having the member 15 secured to the underside thereof at the inner ends and resting in a socket shaped groove 16 formed in the upper side of the cross sills 9, said members forming pivots for said floors.

17 are upwardly extending flanges around the outer sides of the floors 14 fitting snugly against the inner walls 18 of the car.

19, 20 and 21 are groups of brackets rigidly secured to the underside of the floors 14. The brackets in each group being arranged in alinement crosswise with the car and each bracket of each group being arranged vertically over one longitudinal girder.

22, 23 and 24 are shoes resting on the top sides of the girders 6 and 8 and having downwardly depending flanges 25 to each side thereof and the upwardly extending lugs 26.

27, 28 and 29 are bars pivotally secured to the lugs 26 on the shoes 22 and to corresponding lugs on the underside of the brackets 19, 20 and 21 respectively. Each separate group of bars is secured together by suitable braces 30, 31 and 32, here shown as formed of angle iron.

33 are pivotal connecting rods joined to the bars 27, 28 and 29 at equal distances from their pivotal connection to the brackets secured to the underside of the floors and arranged at the outside of the outer sets of said bars. It will thus be seen that all of the bars 27, 28 and 29 are pivotally connected together and are adapted to rise on the movement of the shoes 22, 23 and 24 along the girders.

34 are pulleys secured to the cross sills 9 at each side of the central girders 6.

35 are drums extending across the car adjacent to the end sills and having their shafts extending through the side sills. 36 are ratchet wheels fixedly secured to the outer ends of said drum shafts. 37 are levers pivoted on the shafts of the drums 35 having pivoted pawls engaging said ratchet wheels and adapted to be used in turning the said drums to raise the floors.

38 are ratchet pawls secured to the sides of the car and engaging the ratchet wheels 36.

39 are flexible cables extending around the drums 35 and the pulleys 34 and secured at the ends to the shoes 24 so that on the turning of said drums said shoes will travel longitudinally on the top of the girders. The floors 14 normally rest in a horizontal position but when it is desired to use the car for a grain car, the floors are raised to the position shown in Fig. 3 by operating the lever 37 and sliding the shoes of the bars 27, 28 and 29 upon their supporting girders, said bars moving simultaneously through the connections of the rods 33 and forming struts to support the said floors in their raised position.

40 are flanges secured to the inner side walls of the car and projecting downwardly and adapted to receive the upwardly extending flanges 17 of the sides of the floors.

41 are inwardly extending partition walls adapted to meet the end flanges of the floors 14 and closing off the opening between the ends of said floors and the ends of the car and forming a continuation of the sloping bottom formed by said floors.

42 is an inclined bottom arranged in the center of the car sloping from one side thereof downwardly.

43 is a hinged member secured at the lower side of the inclined bottom 42 and closing the opening between the outer side of said bottom and the bottom of the car, said hinged member having the arc shaped end flanges 44 secured to the ends thereof fitting snugly against the sides 45 closing in the said inclined bottom 42.

46 is a spout secured in the hinged member 43 and having a suitable gate opening therein, said spout forming a small opening for drawing off small portions of grain from the car.

47 is a platform hinged to one side of the opening leading to the inclined bottom 42 and adapted to close down upon the higher side of said inclined bottom and rest thereon at its outer side in horizontal position. 48 is a platform similar to the platform 47 arranged slightly above the level of the platform 47 and adapted to fit down over the top of the platform 47, said platform 48 being arranged on the same level as the floors 14 when the said floors are in their lowermost position, thus completing the inner level surface of the car floor when said car is used for ordinary freight purposes.

In the use of this device, the movable bottoms rest securely in their horizontal position, the cross braces secured to the members for raising and lowering the said bottoms resting upon the longitudinal beams of the car and the hinged platforms 47 and 48 covering over the central chute formed by the inclined bottom 42, thus a level floor is presented and the car may be used for ordinary freight purposes.

When it is desired to use the car for the transportation of grain, the platforms 47 and 48 are swung upwardly to close the door openings in the side of the car and the pivotal floors are raised to their uppermost position with the side flanges extending under the flanges 40 secured to the side walls of the car. The floors are raised by turning the drums 35, said drums pulling on the cables 39 and causing the shoes to slide longitudinally on the girders, thus lifting the floors through the medium of the pivotal bars 27, 28 and 29. When the said bars are drawn to their vertical position, the floors will be supported in their raised position with the side flanges extending under the flanges 40, said floors with the inner walls of the car forming a hopper shaped receptacle. The grain is loaded into the car through trap doors in the top which are placed very conveniently to allow of the proper placing of the grain.

A car of this description may be unloaded in a few minutes and without requiring any manual labor, it being merely necessary to open the door 43 at the end of the chute and the grain will flow freely until the car is emptied. A great deal of time in unloading will be saved and the holding up of cars for unloading obviated. Further, while the car is specially adapted to carry grain, it can be used for ordinary freight purposes with equal facility, consequently its value to the railway company will be considerably enhanced when it is used in a district where freight can be carried one way and grain the other.

What I claim as my invention is:—

1. In a convertible box car, the combination with the car body, of a movable floor pivotally supported at one end and adapted to be raised at the free end to form a hopper shaped interior to the car, a plurality of strut members pivotally secured at one end to said movable floor and slidably supported at the other end, and means for operating said strut members to raise said pivotal floor.

2. In a convertible box car, the combination with the car body, of a movable floor pivotally supported at one end and adapted to be raised at the free end to form a hopper shaped interior to the car, a plurality of bars pivotally connected at one end to said floor and forming struts for supporting said floor in its raised position, means for slidably supporting the free ends of said struts, and means for sliding the free ends of said struts on their supports and raising and lowering the free end of said floor.

3. In a convertible box car, a car body having longitudinal slide-ways formed in the bottom thereof, a movable floor pivotally supported at one end above said slide-ways and adapted to be swung on its pivot to form a hopper shaped interior to the car, a plurality of bars forming struts pivotally connected to the under side of said floor and rigidly connected together, shoes pivotally connected to the free ends of said struts and sliding in said slide-ways, and means for sliding said shoes on said slide-ways to raise and lower the free end of said floor.

4. In a convertible box car, a car body having longitudinal slide-ways formed in the bottom thereof, a movable floor pivotally supported at one end above said slide-ways, a plurality of bars forming struts pivotally connected to the underside of said floor and rigidly connected together, shoes pivotally connected to the free ends of said struts and sliding on said slide-ways, a winding drum suitably journaled in the car frame, a pulley suitably journaled from the car frame, and an endless belt secured to said shoes and extending around said pulley and drum for sliding said shoes longitudinally on said slide-ways to raise and lower the free end of said floor.

5. In a convertible box car, a car body having longitudinal slide-ways formed in the bottom thereof, a movable floor pivotally supported at one end above said slide-ways, a plurality of bars arranged in sets of different lengths and pivotally secured to the underside of said floor, the bars of each set being rigidly connected together, connecting rods pivotally connecting the several sets of bars together, shoes pivotally secured to the free ends of said bars, and means for sliding said shoes on said slide-ways to raise and lower the free ends of said floor.

6. In a convertible box car, a car body having a plurality of beams extending longitudinally thereof, a pivotal floor supported above said beams, a plurality of struts pivotally secured to the underside of said floor, flanged shoes resting on the upper side of said beams and slidable thereon, said shoes being pivotally connected to the free ends of said struts, means for sliding said shoes on said beams and holding them securely when the floor is in its raised position.

7. In a convertible box car, a car body having longitudinal slide-ways formed in the bottom thereof, a movable floor pivotally supported at one end above said slide-ways, a plurality of bars pivotally connected to the under side of said floor and rigidly connected together, shoes pivotally connected to the free ends of said bars and sliding on said slide-ways, a winding drum suitably journaled in the car frame, a pulley suitably journaled from the car frame, an endless belt secured to said shoes and extending around said pulley and drum for sliding said shoes longitudinally on said slide-ways, a lever and pawl mechanism for turning said drum, and a pawl and ratchet mechanism co-acting with said drum to hold the floor in its raised position.

8. In a convertible box car, a car body having cross sills arranged at each side of the door openings, and an inclined bottom arranged between said sills and forming a chute, a pair of movable floors pivotally supported at their inner ends from said sills, means for raising and lowering the outer ends of said pivotal floors, a platform fitting between said sills and pivotally supported at one end, and a platform arranged above the aforesaid platform and pivotally supported at the opposite end, said upper platform being arranged to complete the level floor of the car and both of said platforms forming inside grain doors to the side door openings when raised.

9. In a convertible box car, a car body having an inner lining and a central laterally arranged inclined chute, a door closing said chute, pivotal grain doors closing the side door openings in the car and adapted to swing downwardly to cover said chute, a pair of pivotal platforms forming the floor of the car adapted to swing upwardly at their outer ends, said platforms having upwardly extending flanges from the sides, flange members substantially Z-shaped in cross section rigidly secured to the inner walls of the car and sloping angularly upward from the side door openings and adapted to house the upstanding flanges of said pivotal floors, and means for raising and lowering said floors.

Signed at the city of Nelson in the Province of British Columbia, Canada this 2nd day of July, 1909.

JOHN ALBERT ANSLEY.

Witnesses:
 LEWIS HALL,
 J. D. WELLS.